(12) United States Patent
McKay (10) Patent No.: US 10,605,393 B2
(45) Date of Patent: Mar. 31, 2020

(54) FLOW LINE CONNECTOR ASSEMBLY (71) Applicant: SUBSEA TECHNOLOGIES LIMITED, Aberdeen, Aberdeenshire (GB)

(72) Inventor: David Ernest McKay, Aberdeenshire (GB)

(73) Assignee: SUBSEA TECHNOLOGIES LIMITED, Aberdeen (GB)

( * ) Notice: Subject to any disclaimer, the term of this patent is extended or adjusted under 35 U.S.C. 154(b) by 159 days.

(21) Appl. No.: 15/563,741

(22) PCT Filed: Mar. 31, 2016

(86) PCT No.: PCT/GB2016/050915
§ 371 (c)(1),
(2) Date: Oct. 2, 2017

(87) PCT Pub. No.: WO2016/156857
PCT Pub. Date: Oct. 6, 2016

(65) Prior Publication Data
US 2018/0080590 A1 Mar. 22, 2018

(30) Foreign Application Priority Data

Apr. 2, 2015 (GB) .................................. 1505788.8

(51) Int. Cl.
*F16L 37/32* (2006.01)
*F16L 37/127* (2006.01)
(Continued)

(52) U.S. Cl.
CPC ............ *F16L 37/32* (2013.01); *E21B 17/046* (2013.01); *E21B 33/038* (2013.01); *E21B 34/00* (2013.01);
(Continued)

(58) Field of Classification Search
CPC ..... Y10T 137/87973; Y10T 137/87965; Y10T 137/87957; Y10T 137/87949;
(Continued)

(56) References Cited

U.S. PATENT DOCUMENTS 2,854,258 A * 9/1958 Slough, Jr. ............ F16L 37/252
137/614.04
2,926,934 A 3/1960 Gill
(Continued)

FOREIGN PATENT DOCUMENTS

| CN | 2727531 Y | 9/2015 |
|---|---|---|
| EP | 2722479 A1 | 4/2014 |
| WO | WO2013160846 A1 | 10/2013 |
| WO | WO2014114890 A1 | 7/2014 |
| WO | WO2016038396 A1 | 3/2016 |

OTHER PUBLICATIONS

International Search Report for PCT/GB2016/050915, dated Aug. 30, 2016, 7 pages.
(Continued)

*Primary Examiner* — Jessica Cahill
(74) *Attorney, Agent, or Firm* — Foley & Lardner LLP; Terrell R. Miller; Teresa J. Lechner-Fish (57) ABSTRACT

A flow line connector assembly has first and second parts respectively comprising a plug, and a socket configured to receive the plug; a restraining device to resist disconnection of the first and second parts when the plug is received in the socket; and flow tubes, wherein each of the plug and the socket has a respective flow tube and the flow tubes are adapted to interconnect to form Ca conduit for fluid to flow between the first and second parts when the plug is received in the socket.

28 Claims, 8 Drawing Sheets (51) Int. Cl.

| | |
|---|---|
| *F16L 55/10* | (2006.01) |
| *F16L 1/26* | (2006.01) |
| *F16L 37/096* | (2006.01) |
| *F16L 37/20* | (2006.01) |
| *F16L 55/07* | (2006.01) |
| *E21B 43/013* | (2006.01) |
| *E21B 34/00* | (2006.01) |
| *E21B 43/01* | (2006.01) |
| *E21B 17/046* | (2006.01) |
| *E21B 33/038* | (2006.01) |
| *E21B 34/06* | (2006.01) |

(52) U.S. Cl.
CPC ............ *E21B 34/06* (2013.01); *E21B 43/013* (2013.01); *E21B 43/0107* (2013.01); *E21B 43/0135* (2013.01); *F16L 1/26* (2013.01); *F16L 37/096* (2013.01); *F16L 37/127* (2013.01); *F16L 55/1015* (2013.01); *E21B 2034/005* (2013.01); *F16L 37/20* (2013.01); *F16L 55/07* (2013.01)

(58) Field of Classification Search
CPC ..... Y10T 137/87941; Y10T 137/87933; F16L 37/32; F16L 1/26; F16L 37/096; F16L 37/127; F16L 55/1015; F16L 37/20; F16L 55/07; E21B 17/046; E21B 33/038; E21B 34/00; E21B 34/06; E21B 43/0107; E21B 43/013; E21B 43/0135
See application file for complete search history.

(56) References Cited

U.S. PATENT DOCUMENTS

| | | | | |
|---|---|---|---|---|
| 5,115,836 | A | * | 5/1992 | Carow ................ F16L 27/0816 137/614.04 |
| 6,095,190 | A | * | 8/2000 | Wilcox .................... F16L 37/23 137/614 |
| 6,463,957 | B1 | * | 10/2002 | Ozawa .................... F16L 37/36 137/614 |
| 2003/0168857 | A1 | | 9/2003 | Jennings |
| 2005/0199297 | A1 | | 9/2005 | Nimberger |
| 2009/0205726 | A1 | * | 8/2009 | Kouda .................... F16L 37/23 137/614.03 |
| 2010/0320747 | A1 | | 12/2010 | Takahashi |
| 2011/0025044 | A1 | | 2/2011 | McKay |
| 2012/0199358 | A1 | | 8/2012 | Larsson |
| 2013/0146301 | A1 | | 6/2013 | Lugo |
| 2016/0047503 | A1 | * | 2/2016 | Ballard .................... F16L 37/34 251/149.7 |
| 2018/0003324 | A1 | * | 1/2018 | Dinh .................... B60L 11/1874 |

OTHER PUBLICATIONS

Subsea Technologies: "STL Connectors Animation", YouTube, Aug. 25, 2015 (Aug. 25, 2015), pp. 1-1. XP054976625, Retrieved from the internet: URL: https://www.youtube.com/watch?v=6hVi8a3F4YQ.
Search report for GB1605491.8 dated Sep. 27, 2016, 3 pages.
Written opinion for PCT/GB2016/059015, 11 pages.

* cited by examiner

FLOW LINE CONNECTOR ASSEMBLY

This invention relates to a flow line connector assembly, and particularly to a flow line connector assembly in a subsea flow line used to convey a fluid to or from a subsea well.

It is frequently necessary to convey fluid between a subsea well and the surface. When conveying fluid to the well, a flow line is normally deployed from a support vessel on the surface, or from a platform, to the seabed, and is optionally ballasted near the flow line terminal connector on the end of the flow line within reach of a well. The subsea stack on the seabed at the wellhead normally has a mating connector adapted to connect to the terminal connector in the end of the flow line in order to make up the connection.

Changes in position of the vessel are minimised by dynamic positioning systems to avoid accidental disconnection of the flowline while fluids are flowing. Accidental disconnections can be costly in terms of lost revenue from loss of valuable fluids and lost time taken to reconnect, and are environmentally unacceptable because of the risk of release of hydrocarbons and/or other toxic fluids into the environment around the wellhead.

SUMMARY OF THE INVENTION

According to the present invention there is provided a flow line connector assembly having first and second parts, the first part having a mating portion comprising a plug and the second part having a mating portion comprising a socket configured to receive the plug, the assembly having a restraining device to resist disconnection of the first and second parts when the plug is received in the socket, wherein each of the plug and socket has a respective flow tube, the flow tubes being adapted to interconnect to form a conduit for fluid to flow between the first and second parts when the plug is received in the socket.

Optionally the first and second parts comprise end terminations of a flow line. Optionally the ends of the first and second parts opposite to the mating portions are configured to connect to a fluid flow line. Optionally the connector assembly is configured to be used on a submerged flow line, optionally connecting a surface supply of fluid to a subsea location, optionally an offshore well having a wellhead on the sea bed.

Optionally, the first and second parts are connected by a restraining device resisting disconnection of the assembly when the plug is in the socket. Optionally the restraining device comprises at least one recess on one of the socket and the plug, and at least one dog on the other. Optionally, a lever arm is pivotally connected to an external face of one of the plug and the socket, optionally the socket. Optionally, two lever arms are provided. Optionally respective lever arms are pivotally connected to the plug on opposing and parallel faces on the external surface of the plug. Optionally, the dog engages within the recess in order to resist relative axial movement of the plug and the socket when the restraining device is engaged. Optionally, the dog is provided on a lever arm, having a pivot link connecting the lever arm to one of the first and second parts. Optionally, the pivot link connects one end of the lever arm to the first or the second part, in a cantilever manner, leaving the opposite end free. The lever arm is optionally provided with a locking device configured to resist movement of the lever arm around the pivot link, typically once the restraining device is engaged, and this is optionally provided at the free end of the lever arm, opposite to the pivot point. Optionally, when the locking device is engaged with the lever arm, the dog is locked into the recess, thereby locking the restraining device in place and restricting or preventing disconnection of the first and second parts. Optionally the locking device restrains movement of the lever arms in the locked configuration.

Optionally the locking device comprises a locking collar that receives and restrains at least a part of the lever arms (for example the free ends) and resists pivotal movement of the lever arms around the pivot points, thereby resisting movement of the dogs from the recesses. Optionally the locking device can be connected to the lever arms by frangible devices such as shear pins, adapted to shear when at a predetermined tensile force applied to the pins by the axial movement of the locking device. Optionally the locking device can be biased resiliently (optionally in an axial direction) into the locked configuration.

Optionally, the recess to engage the dog is provided in the plug. Optionally, the recess comprises a shoulder. The shoulder in the recess optionally engages a face on the dog. Optionally, the inter-engaging faces on the recess and the dog can be arranged at the same angle. Optionally, the face on the recess which engages with the face in the dog is provided at the end of the recess nearest to the free end of the plug.

Optionally, the flow tubes in the plug and the socket interconnect end to end. Optionally the flow tubes are latched together by a latching device, which optionally latches onto the outer surfaces of the end portions of the flow tubes, and surrounds at least a part of the end portion of each flow tube when the flow tubes are latched together. This is advantageous, because the end to end connection between the flow tubes allows the conduit to be made up with no reduction in bore size through the connector. Hence, fluid flow rates through the assembly are substantially unaffected by the connector assembly. The latching device is typically actuated by axial movement of the flow tubes within the connector assembly when the assembly is made up. Optionally the latching device remains active thereby latching the flow tubes together until the two parts of the connector are separated by a minimum distance. Optionally the axial movement of the flow tubes within the connector assembly activates and de-activates the flow tube latching device.

Optionally at least one of the flow tubes is latched to at least one of the plug and the socket. Optionally the flow tube in one of the plug and the socket is latched to the other. Optionally the flow tube in the socket is latched to the plug. The latch between the plug and the flow tube in the socket can be activated and deactivated by axial movement of at least one of the flow tubes within the assembly, and axial movement of the first and second parts during disconnection and connection optionally unlatches and latches the flow tubes. Optionally the flow tube in one of the socket and the plug is latched to the other of the socket and the plug and to the other flow tube in the connected configuration, so that both flow tubes move with the said other of the socket and the plug. Optionally the latching device connecting the flow tubes to the plug disconnects from the plug during disconnection of the plug and socket, optionally triggered by movement of the plug through the socket.

Optionally the latching devices acting on the flow tubes comprise resiliently biased annular members which are held in a first configuration in a first axial position, and which radially expand or contract into a second configuration, for example an unlatched configuration, in a second axial position that is spaced apart from the first position within the connector assembly.

Optionally the flow tubes are received in axial bores in the plug and the socket, and are axially moveable in the bores. Optionally the axial bores have annular recesses for expansion of the resiliently biased annular members at particular axial locations within the bores. Expansion of the resiliently biased annular members into the recesses when the flow tubes are in the desired axial position optionally switches the latching devices between activated and de-activated configurations.

Optionally the flow tubes are movable with respect to their respective first and second parts. Optionally each flow tube can move axially within its respective part.

Optionally the flow tubes can comprise internal bores in the plug and socket, but in other aspects of the invention, the bores can optionally be external, mounted on an external surface of the plug and the socket. Thus conduit(s) need not pass through the centre of the connector and can optionally be mounted externally.

Optionally each of the flow tubes incorporates a closure device, which optionally activates during disconnection to close the bore of the flow tube in the event of emergency disconnection of the plug from the socket. Optionally each flow tube has a respective closure device which activates to close the bore of its flow tube, and can optionally do so automatically during disconnection. The closure device is optionally resiliently biased into the closed position, but can optionally be switched into the open configuration by axial movement of its flow tube.

Optionally the closure device comprises a valve such as a check valve, which may optionally function automatically upon disconnection of the plug from the socket. Optionally the check valve can be biased by a spring or other resilient device. Optionally the check valve can comprise a flapper valve, which can be pivotally attached to a pivot link outside the flow tube, and can pivot around the pivot link from a closed configuration, in which it occludes the bore of the flow tube, to an open configuration outside the flow tube. Optionally the check valve is located at an end of the flow tube. Optionally the outer ends of the flow tubes are provided with the check valves, and the inner ends of the flow tubes connect together.

Optionally the check valve closes upon emergency disconnection of the plug from the socket. Optionally the check valve closes upon movement of the flow tube in an axial direction, optionally under the force of the resilient device, and optionally when the axial movement of the flow tube moves the flow tube from the bore of the ring, so that the flow tube no longer supports the flapper in the open position, against the force of the resilient device. Optionally in one axial position, the flow tube maintains the open configuration of the check valve and overcomes the bias of the resilient device, which optionally acts to urge the check valve into the closed configuration. In a second axial position, optionally spaced apart from the first, the flow tube moves relative to the check valve, optionally relative to the pivot point of the flapper valve, and removes the support for the check valve, which then moves under the force of the resilient device into the closed configuration.

Optionally the closure device on one flow tube activates before the closure device on the other flow tube. Optionally during disconnection, and assuming that fluid is being pumped from the ship (upstream) into the well (downstream), the closure device on the upstream flow tube furthest from the well closes before the flapper on the downstream flow tube closer to the well. Optionally both of the flappers close before the plug is removed from the connector bore. Optionally the plug is sealed in the connector bore. Optionally the closure devices are mounted on rings in the first and second parts, and the rings optionally have bores that receive and allow passage of the flow tubes through the rings, so each ring typically surrounds a portion of its flow tube, and allows axial movement through the ring. Optionally the closure devices can incorporate a seal between the rings and the flow tubes.

Optionally the bores of the plug and socket that contain the flow tubes have pockets for receiving the closure device when in the open configuration, so that the closure device is moved out of the path of the flow tube in the open configuration. Optionally the pivot connections between the ring and the flapper are disposed outside the bore of the flow tube.

Optionally the bores of the plug and socket that contain the flow tubes have pressure equalisation pathways such as ports extending through a wall of the plug and/or the socket, allowing pressure to be equalised between the bore and the exterior of the connector assembly during connection or disconnection. Optionally pressure equalisation pathways allow pressure equalisation between the pockets and the interior of the flow tubes when the connector assembly is connected. Optionally the pressure equalisation pathways have debris barriers resisting passage of debris through the pathways.

Optionally, the connector assembly incorporates a disconnect system reactive to tension, which disconnects the connection assembly above a tension threshold. Optionally, the disconnect system is reactive to tension across the connector assembly, i.e. between the two parts. Optionally the disconnect system comprises a trigger line connected between a trigger mechanism on the assembly and a part of the flow line spaced apart from the connector assembly.

Optionally the trigger line is shorter than the length of flow line between the connector assembly and the trigger line connection to the flow line, whereby the trigger line is tensioned and activates the disconnect system on the connector assembly before the flow line between the connector assembly and the trigger line is subjected to excessive tension.

Optionally the trigger mechanism acts on the locking device. Optionally the trigger mechanism comprises a trigger sleeve that engages the locking collar, and moves axially under the force from the trigger line. Optionally the trigger sleeve is connected to the locking collar by a slide mechanism that allows limited axial movement of the trigger sleeve relative to the locking collar before the trigger sleeve engages the locking collar and causes axial movement of the locking collar with the trigger sleeve. The limited extent of axial movement of the trigger sleeve relative to the locking collar can be varied in accordance with different parameters. The trigger sleeve is optionally resiliently biased in an axial direction, optionally towards the locking sleeve and the lever arms.

The connector assembly optionally has a locked configuration, when the first and second parts are engaged, and the locking device is locked to resist movement of the restraining device. The connector assembly can also adopt an unlocked configuration. In the unlocked configuration, the locking device is de-activated, allowing deactivation of the restraining device. The arms are optionally biased gently outwards by a resilient device such as a spring, so when the locking device is disengaged, the dogs move out of the recesses, and the plug can be pulled out of the socket. The force of the spring advantageously helps the dogs to move out of the recess and helps to keep them out of the recess once the parts are disconnected, but the primary force tending to move the dogs out of the recesses is optionally provided by axial load between the plug and the socket, which can come from the pressure end load in the connector combined with the applied external axial force applied through the trigger line. This combined force urges the plug axially from the socket and the shoulder on the plug can simply force the dogs aside on its way out without necessarily having any loading from the springs.

When the connector assembly is in the locked configuration, with the locking device engaged to retain the dogs in the recess, the assembly can be disconnected under emergency conditions, optionally as a result of excess tension across the connector assembly. This may occur, for example as a result of drifting of the support vessel.

The emergency disconnect system activates when a threshold of tensile load is applied to the trigger device to overcome the preload on a resilient device (e.g. a spring) biasing the trigger sleeve into the locked configuration. The first stage of axial movement of the trigger device optionally does not move the locking sleeve nor does it disengage the restraining device, and in the first stage of ED, the dogs are still fully engaged in the recesses, thereby locking the first and second parts together. At this point if the tension were released the trigger sleeve would be pushed back to its starting position by the spring.

The ED sequence is only triggered after the trigger sleeve is pulled beyond the first stage. When the trigger sleeve has been pulled beyond the first stage, the trigger sleeve is pulled axially for a sufficient distance to take up the slack in the slide mechanism between the trigger sleeve and the locking collar, which then moves axially with the trigger sleeve with sufficient force to shear the pins connecting the locking collar to the lever arms. Once the pins have sheared, the locking collar is pulled off the free ends of the lever arms, which are then free to move, and this releases the dogs on the lever arms from the recesses on the plug. The plug can then pull axially clear of the socket. As the plug and socket separate, the tension on the trigger sleeve is released and it is forced back to its home position by the spring.

Optionally the flowline on each side of the connector assembly is flexible, but the connector assembly can be used in rigid flowlines, or to connect a flexible flowline to a rigid flowline.

Optionally, the trigger sleeve can be functioned by means of hydraulics rather than direct tension.

Optionally the connector assembly can be made up by an ROV.

Optionally each part can incorporate a bend restrictor. Optionally at least one part can incorporate a protection cage.

Optionally the connector assembly is recovered to the surface for re-connection.

The connector assembly can provide an Emergency Quick Disconnect (EQD) function in a high pressure flexible flowline. The connection normally remains connected in all conditions other an EQD event. After an EQD event, The connector does not have to be re-connected subsea following an EQD event, both ends of the assembly can be retrieved to surface and the connection is optionally re-established on deck. When connected the bore of the connector present minimal restriction to flow. Initiation of an EQD is triggered by over tension in the flow line. One side of the flow line has a "slack" section with a separate lanyard bridging it to allow over tension in the flow line to activate the EQD.

In one optional example, the trigger sleeve can be fixed and the pull on the flow line on the plug side causes the required relative movement between the trigger sleeve and the socket half by pulling the connector assembly itself. In this example, there is optionally still some slack in the hose/pipework on the socket side to allow that movement to occur.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can optionally be combined alone or together with other features in different aspects of the invention. Any subject matter described in this specification can be combined with any other subject matter in the specification to form a novel combination.

Various aspects of the invention will now be described in detail with reference to the accompanying figures. Still other aspects, features, and advantages of the present invention are readily apparent from the entire description thereof, including the figures, which illustrates a number of exemplary aspects and implementations. Any subject matter described in the specification can be combined with any other subject matter in the specification to form a novel combination. The invention is also capable of other and different examples and aspects, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa. In this disclosure, the words "typically" or "optionally" or derivatives of the same are to be understood as being intended to indicate optional or non-essential features of the invention which are present in certain examples but which can be omitted in others without departing from the scope of the invention.

All numerical values in this disclosure are understood as being modified by "about". All singular forms of elements, or any other components described herein are understood to include plural forms thereof and vice versa. References to directional and positional descriptions such as upper and lower and directions e.g. "up", "down" etc. are to be interpreted by a skilled reader in the context of the examples described to refer to the orientation of features shown in the drawings, and are not to be interpreted as limiting the invention to the literal interpretation of the term, but instead should be as understood by the skilled addressee.

DETAILED DESCRIPTION OF EXAMPLES OF THE INVENTION

Figure 11:
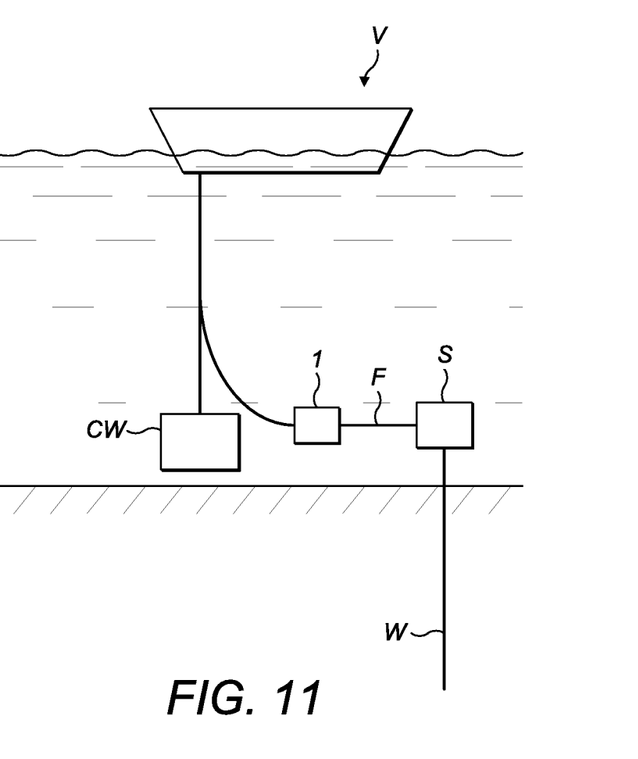
FIG. 11 shows a schematic arrangement of the connector assembly in use to connect a flow line between a well and a surface vessel.

Referring now to the drawings, a connector assembly 1 comprises a first part 10 incorporating a plug 11 at its mating (outer) end for connection with a second part 20 incorporating a socket 21 at its mating end. The first part 10 has a cylindrical bore extending between opposite ends and aligned with the axis X-X of the connector assembly. The inner end of the first part 10 opposite the outer mating end with the plug 11 is adapted to connect to a flowline F configured to convey a fluid between a subsea well W and the surface supply ship V. The fluid can be supplied from the ship V to the well W or vice versa. The first part 10 is optionally connected to a well W, optionally to a wellhead stack S on the seabed, as shown in FIG. 11. The flowline has a clump weight CW to stabilise the flow line in the water column. Fluid supplied from the surface supply ship V is conveyed through the flowline F and through the connector 1. In this example, the connector assembly connects fluid conduits, but in other examples the conduits could be of other types such as signal or power conduits or combinations of the same. Flow of fluid in the opposite direction is also contemplated by this example.

The plug 11 optionally has a generally cylindrical body with a cylindrical bore 11b. The cylindrical body of the plug 11 has a narrow diameter section 11n near its mating (free) end. The opposite inner end of the plug 11 has a wider diameter section 11w (also cylindrical) that is threaded on the outer surface to receive the mating thread of a cap 12. The cap 12 screws onto the inner end of the plug 11, and is secured by at least one grub screw. A seal is provided between the cap 12 and the plug 11. The cap 12 provides an adapter for the connection of the flow line F at its inner end. The cylindrical wider diameter section 11w houses a closure device in the form of a flapper valve 13 mounted on a pivot axis set on an annular ring 13r that is connected to the wider diameter portion of the plug 11w. The cap 12 also has a pair of ports 12p allowing pressure equalisation between the interior and exterior of the cap 12 in use, and allows for injection of fluids such as grease into the cap 12. The bore 11b has an internal annular seal in the form of an o-ring on its outer mating end.

The second part 20 likewise has a socket 21 with a generally cylindrical bore 21b extending axially from one end of the second part 20 to the other. The inner end of the second part 20 opposite to the plug 11 is adapted to connect to flowline F, and in most (but not all) examples, the flowline F then conveys fluid to the ship V as is shown in FIG. 11. The bore 21b has different inner diameters along its length and has an internal annular seal in the form of an o-ring on a narrow internal shoulder in the bore 21b.

The second part 20 comprises a generally cylindrical body forming the socket 21 with a relatively narrow diameter generally cylindrical section 21n near its mating outer end, and which is adapted to receive the plug 11. The inner end of the socket 21 connected to the flowline F has a wider diameter section 21w (also cylindrical) that is threaded on the outer surface to receive the mating thread of a cap 22. The cap 22 has a seal and at least one grub screw and is essentially the same as the cap 12. The cap 22 provides an adapter for the connection of the flowline F at the inner end of the second part 20. The cylindrical wider diameter section 21w houses a closure device in the form of a flapper valve 23 mounted on a pivot axis set on an annular ring 23r that is connected to the wider diameter portion 21w of the socket 21. The cap 22 optionally has a pair of ports 22p allowing pressure equalisation and injection as previously described for the ports 12p.

The plug 11 is configured to engage within the socket 21 to make up the connector assembly 1. When the plug 11 is engaged within the socket 21, the flow path from the flowline F is connected through the connector assembly 1, and the bores of the first and second parts 10, 20 are aligned along the axis, and interconnect to complete the fluid conduit through the connector assembly 1.

Figure 1:
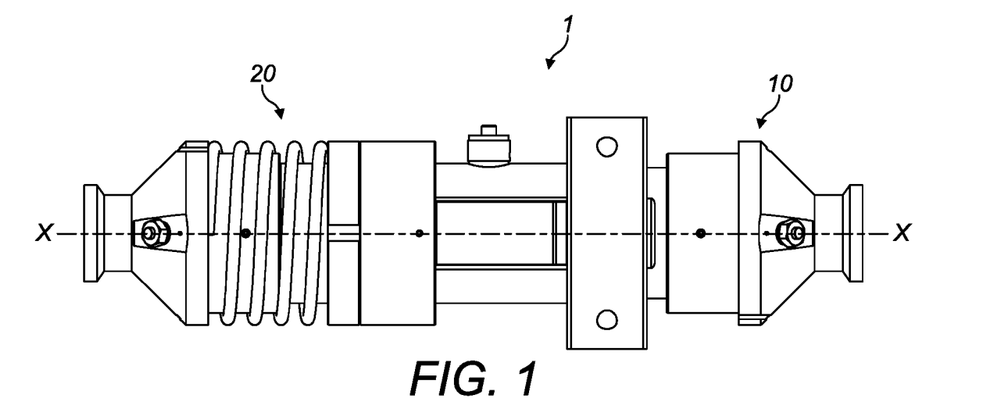
FIGS. 1 & 2 show side and end views of a connector assembly when connected.
Figure 2:
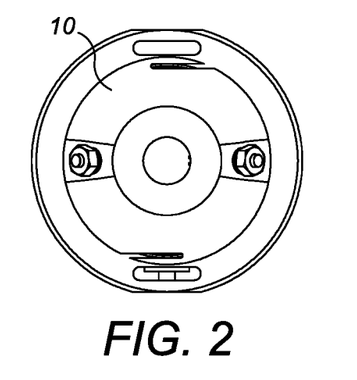
Figure 3:
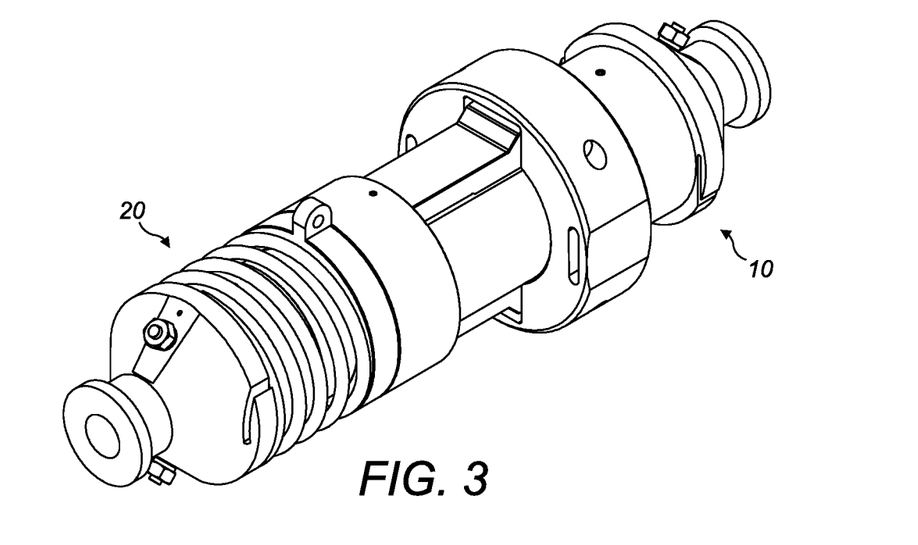
FIGS. 3 and 4 show perspective views of the FIG. 1 connector assembly from different ends.
Figure 4:
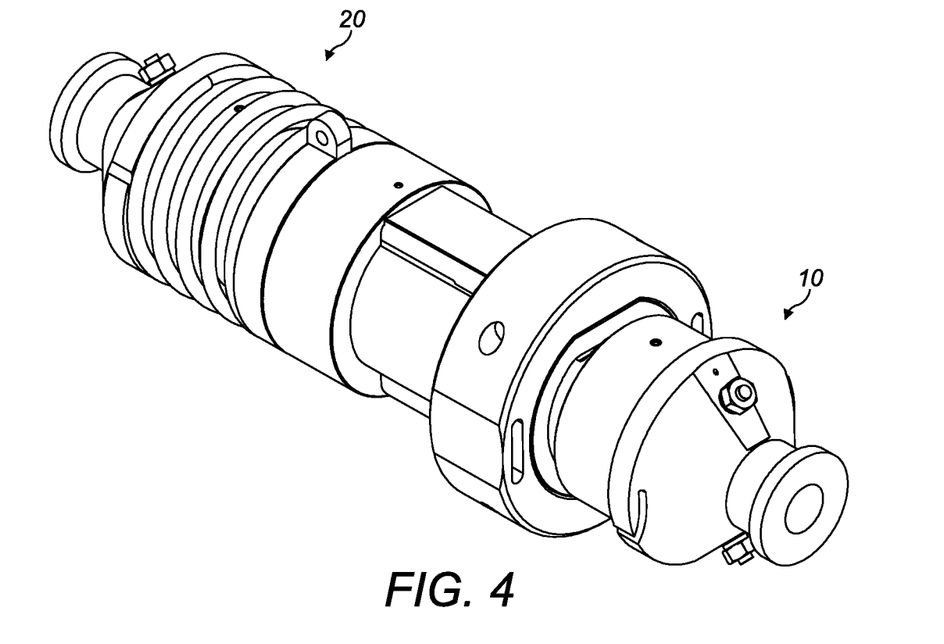
Figure 5:
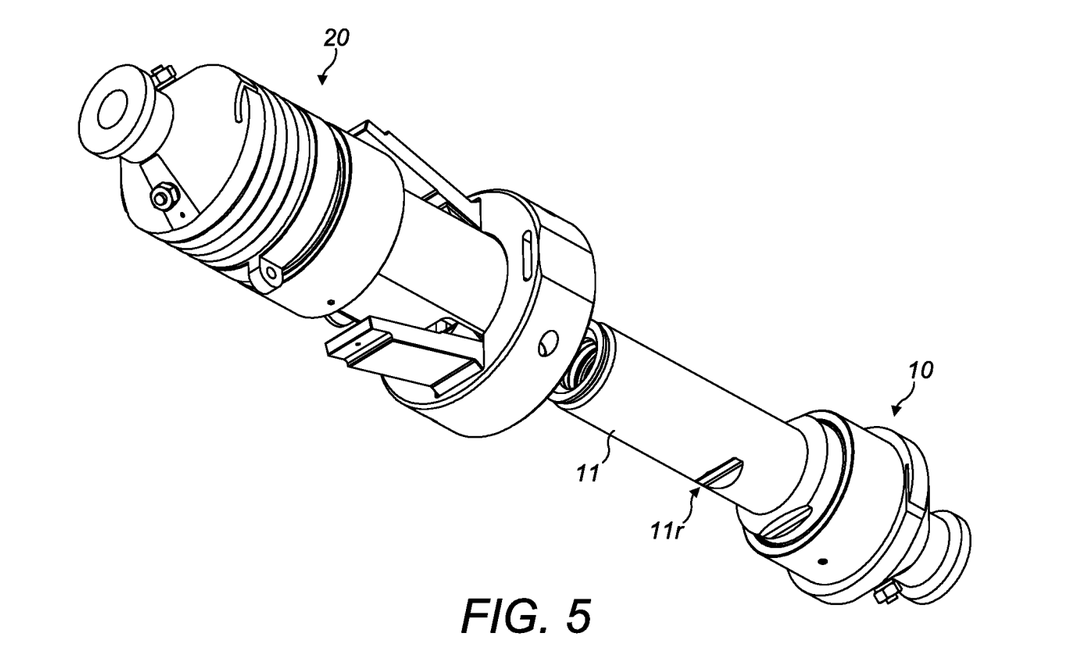
FIG. 5 shows a perspective view of the FIG. 1 connector assembly when disconnected.
Figure 6:
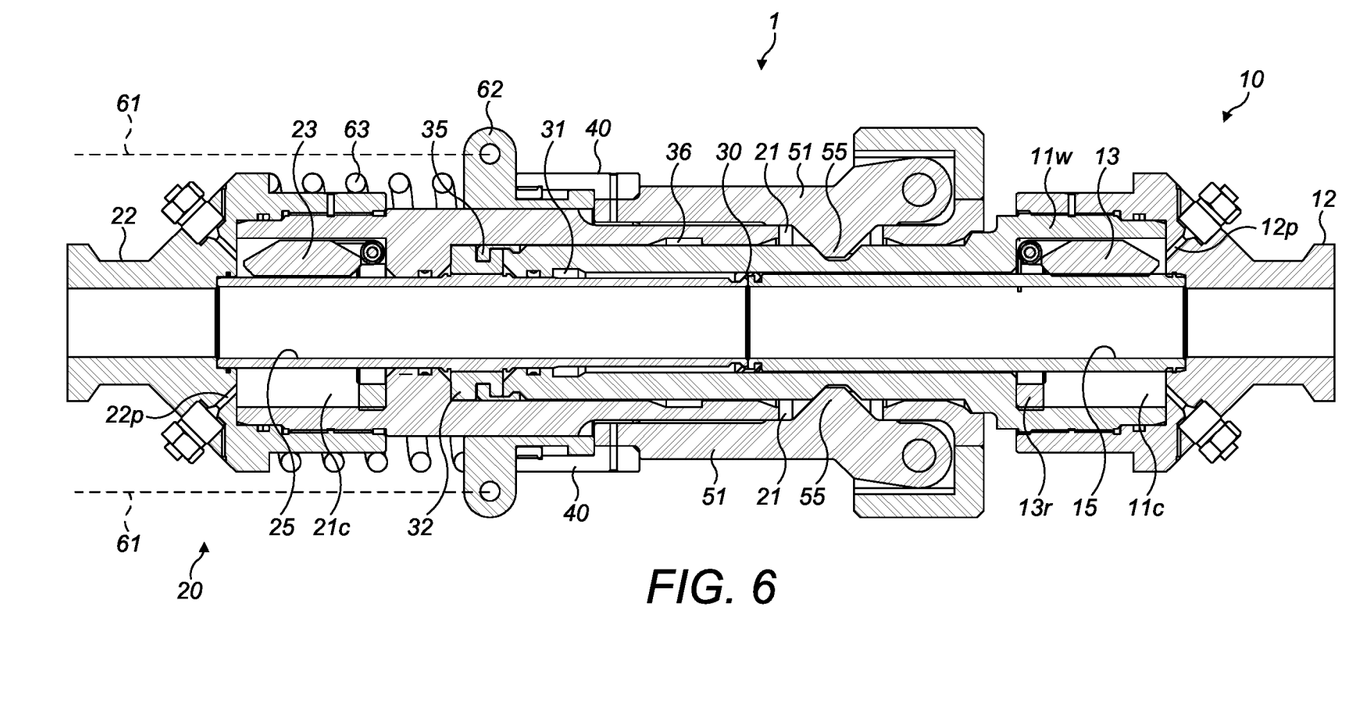
FIG. 6 shows a side sectional view of the FIG. 1 connector assembly when connected.

Each of the bores 11b, 21b of the first and second parts 10, 20 incorporates a respective flow tube. The flow tubes are optionally in the form of cylindrical tubes received within the bores 11b, 21b and are optionally axially moveable (optionally within limits defined by stop members) relative to the first and second parts 10, 20 within their bores 11b, 21b. In the present example, the bore 11b in the plug 11 incorporates a flow tube 15, and the bore 21b within the socket 21 incorporates a flow tube 25. The flow tubes 15, 25 are typically arranged on the same axis (coaxially with the bores 11b, 21b and with the axis x-x) and have the same inner diameter, and so the flow tubes 15, 25 engage one another end to end within the bores 11b, 21b without overlapping and without one of the flow tubes extending into the inner bore of the other. This is an advantage as the flow tubes 15, 25 thereby maintain an optimal internal flow passage with a consistent ID for fluid conduction through the connector assembly 1. The flow tube 15 is slightly shorter than the narrow section 11n of the plug 11, and the flow tube 25 is slightly shorter than the narrow section 21n. The external diameter of the flow tubes 15, 25 forms a close fit with the bore 11b of the plug 11, which can receive both flow tubes 15, 25 within the bore 11b in a close sliding fit as best shown in FIG. 6. Each flow tube 15, 25 has an inner end close to the caps 12, 22, and an opposite outer end, which engages the other flow tube.

The flow tubes 15, 25 are latched together at their outer ends by a flow tube latch ring 30 on the outer ends of the flow tubes 15, 25, which is received in and straddles a pair of annular recess formed in the outer surface of each flow tube 15, 25, as best shown in FIG. 6. When the flow tube latch ring 30 is in place straddling the recesses, the flow tubes 15, 25 are connected together end to end and move together. The flow tube latch ring 30 is resiliently biased outwardly, but cannot leave the recesses in the ends of the flow tubes 15, 25 because of the close fit with the inner diameter of the bore 11b of the plug 11, which keeps the flow tube latch ring 30 compressed radially into the recesses and hold the flow tubes 15, 25 together.

The flow tube 25 in the second part 20 has an flow tube collar 32 on its outer surface, which can be formed integrally with the flow tube 25 if desired, but in this example, it is a separate part secured to the flow tube by a pair of collets one on either side of the collar 32 which engage in grooves in the outer surface of the flow tube 25 and prevent axial movement of the collar 32 relative to the flow tube 25. The collar 32 has a profiled outer surface that engages with a plug latch ring 35, which latches the collar 32 on the flow tube 25 to the outer or free end of the plug 11, which bears a similar profile. In a similar manner to the flow tube latch ring 30, the plug latch ring 35 is resiliently biased radially outward, and is held in compression within the profiles on the plug 11 and collar 32 by the inner diameter of the bore 21b of the socket 21, in which it fits closely. Hence, the flow tubes 15, 25 are latched together by the flow tube latch ring 30, and the flow tubes 15, 25 are latched to the plug 11 by the plug latch ring 25, thereby causing both flow tubes 15, 25 to move together with the plug 11, at least while the latches 30, 35 are activated.

The inner surface of the bore 21b of the socket 21 has a recess 36 adapted to allow expansion of the plug latch ring 35 when it reaches the recess 36, and the inner surface of the bore 11b of the plug 11 has a recess 31 adapted to allow expansion of the flow tube latch ring 30 when it reaches the recess 31.

The first and second parts 10, 20 are locked together by a restraining device 50 which is adapted to resist disconnection of the two parts when the connector is made up. In this example, the restraining device 50 comprises a pair of dogs 55 mounted on the inner surface of a pair of lever arms 51 arranged on opposite faces (e.g. top and bottom faces) of the second part 20. In the present example, the lever arms 51 are pivotally connected to the second part at a pivot connection 51p on opposite faces of the second part 20, at the outer end of the second part 20. The pivot connection 51p connects one end of each lever arm 51 in a cantilever manner to an external surface of the socket 21, and the other free end of each lever arm 51 engages with a locking device in the form of a locking collar 40 that is pinned to the free ends of the lever arms 51 by shear pins. The locking collar 40 surrounds the outer surfaces of the outer ends of the lever arms 51, and thereby resists movement of the lever arm around the pivot link. The pins also resist axial movement of the locking collar 40 relative to the arms 51. When the lever arms 51 are locked together in this manner, with the outer end of the locking collar 40 partially covering the lever arms and pinned thereto, the dogs 55 extend through windows 21i through the faces of the socket 21, protruding into the bore 21b and locking into a recess 11r in the outer face of the plug 11, thereby locking the restraining device 50 in place and restricting or preventing relative axial movement of the first and second parts 10, 20.

In one option, the recess 11r could be on a larger diameter section of the plug. The section of the plug bearing the recess 11r can have a circular or square cross section with the remainder of the plug entering the socket being cylindrical, and optionally having a smaller diameter.

Load-bearing shoulders provided by a ramp on the outer end of the recess 11r and the corresponding engaging load face on the dog 55 are optionally both flat and can be usefully set at the same angle and can usefully have the same shape. The apex between the free edges of the load faces is optionally flat and linear i.e. arranged on a straight line in a single plane. Arranging the load-bearing shoulders of the dog and the recess in this way allows a faster disconnection between the plug 11 and the restraining device 50, allowing a more instantaneous release of the plug 11 from the socket 21. This helps to reduce the wear on the load shoulders during the transitions and helps to reduce shearing of the corners.

The locking collar 40 is fixed in a specific axial position on the outer surface of the second portion, while it is locked in position surrounding the ends of the lever arms 51, which pass partially into the inner bore of the locking collar 40. This creates an annular space inside the locking collar 40, between the inner surface of the locking collar 40 and the outer surface of the body of the socket 21, as the inner end of the locking collar 40 extends axially beyond the free ends of the lever arms 51.

The annular space between the locking collar 50 and the socket 21 houses an outer part of a trigger sleeve 62 forming part of an emergency disconnect system, and the trigger sleeve 62 is loosely connected to the locking collar 40 by a circlip forming part of a slide mechanism. The emergency disconnect system is reactive to tension across the connector assembly 1, and disconnects the plug 11 from the socket 21 above a tension threshold. The emergency disconnect system 60 comprises a trigger line 61 connected between the trigger sleeve 62 on the second part 20 and a part of the flow line F spaced apart from the connector assembly 1. Optionally, the trigger sleeve 62 is biased in an axial direction towards the mating free end of the socket 21 by a spring 63 maintained in compression between the trigger sleeve 62 and a radially outwardly extending shoulder 22s on the cap 22. The trigger line 61 is shorter than the length of flow line between the connector assembly 1 and the trigger line connection to the flow line, so that when the trigger line 61 is tensioned beyond a threshold (below the load limit of the connector assembly 1) it pulls the trigger sleeve 62 axially towards the cap 22 to initiate disconnection of the two mating parts 10, 20 before the flow line is subjected to tension exceeding the threshold.

The emergency disconnect system activates when a threshold of tensile load is applied to the trigger sleeve 62 to overcome the force on the spring 63 biasing the trigger sleeve 62 towards the inner end of the socket 21. However, the system has several stages, not all of which necessarily result in activation of the emergency disconnect.

Initial overpull on the connector assembly 1 tensions the trigger line 61, compresses the spring 63 and moves the trigger sleeve 62 axially towards the outer end of the second part 20. The trigger sleeve 62 is connected to the locking collar 40 by a slide mechanism that allows limited axial movement of the trigger sleeve 62 relative to the locking collar 40 before the slide mechanism engages the locking collar and causes axial movement of the locking collar 40 with the trigger sleeve 62. If the axial range of movement of the trigger sleeve 62 is only slight, then the slide mechanism does not engage the locking collar, and no axial force is applied to the locking collar 40. This is advantageous, because it avoids repeated stresses to the shear pins, thus making them less likely to fail prematurely.

With reference to FIG. 6, in the fully connected and locked position (which is typically made up at the surface before deployment of the connector assembly 1) the plug 11 is fully engaged with the socket 21, the dogs 55 are engaged with the recesses 11r in the plug 11. The lever arms 51 are held in place against their resilient devices tending to bias them outwards by the locking collar 40, which partially extends over the free ends of the lever arms 51. Shear pins between the locking collar 40 and the lever arms 51 secure the locking collar 40 in place on the free ends of the lever arms 51. This configuration locks the dogs 55 and prevents axial movement of the plug 11 from the socket 21, and disconnection of the connector assembly 1.

The trigger line 61 (which can comprise a lanyard) is optionally attached to the trigger sleeve 62 at one or more locations around the circumference of the trigger sleeve 62, so that tension applied to the lanyard is transferred to the trigger sleeve 62. The trigger sleeve 62 interfaces with the locking collar 40 via the slide mechanism such that the trigger sleeve 62 can be pulled for a short distance towards the cap 22 against the force of the preloaded spring 63 without necessarily engaging the locking collar 40. Any tension applied to the trigger sleeve 62 that is within the limits of the tension required to close the gap between the trigger sleeve 62 and the locking collar 40 will have no effect on the connector assembly 1. If the tension is released at this point the spring 63 will simply move the trigger sleeve 62 back to its starting position. This feature ensures that tension applied up to a certain value (which can vary dependent on particular applications) does not necessarily load the shear pins. This avoids the shear pins being repeatedly loaded and unloaded under normal conditions which could cause fatigue and could result in premature failure of the shears pins and hence premature release of the connector.

At the end of travel in the slide mechanism, when a strong load has been applied to the trigger line 61, the trigger sleeve 62 engages a load shoulder on the locking collar 40 and the load is then transmitted to the shear pins where, when sufficient tension is applied, the shear pins shear at their load limits (which can vary in different examples) and allow the trigger sleeve 62 and locking collar 40 to move towards the cap 22, so releasing the free ends of the lever arms 51 from the locking collar 40 and freeing the dogs 55 to move from the recesses under the bias of the soft spring at the pivot point of the lever arms 51.

When fully connected, the two internal flow tubes 15, 25, are brought together to form a full bore unobstructed flow path for the fluids being pumped through the connector assembly. When connected, each of the flow tubes 15, 25 optionally holds a flapper valve 13, 23 in the open position within a cavity 11c, 21c in the wide sections 11w and 21w of the plug 11 and socket 21. The flow tubes 15, 25 and separates the cavities 11c, 21c from the main flow through the connector. A "debris barrier" in the form of a porous filter on the end of each flow tube 15, 25 optionally serves to allow pressure to equalize between the through bores 15, 25 and the cavities 11c, 21c where the flapper valves are mounted, resisting passage of debris, sand etc. in the fluid flow from entering the cavities 11c, 21c around the flapper valves, and impeding future cycles of the flapper valves 13, 23. Each cavity 11c, 21c around the flapper valve 13, 23 optionally has at least one port 12p, 22p (optionally faced with a blanking plug) allowing the cavity 11c, 21c to be filled with oil or grease or a similar maintenance fluid, or to allow bleeding of air from the cavities before deployment. The ports 12p, 22p also serve to allow verification that there is no pressure trapped in the cavity, which can be useful prior to disassembly on surface.

In the connected and locked configuration shown in FIG. 6, there is no restriction as to the direction of flow through the connector, and no impedance to the bore of the flow tubes 15, 25. The primary direction of flow would depend on the overall application, but for the purposes of this example, the flow is from left to right in the figures, from the ship V to the well W. In that situation, the main length of hose from the connector to the ship V on the surface is connected to the socket 21, and flapper 23 closes first to avoid discharge from the delivery side into the environment.

Figure 7:
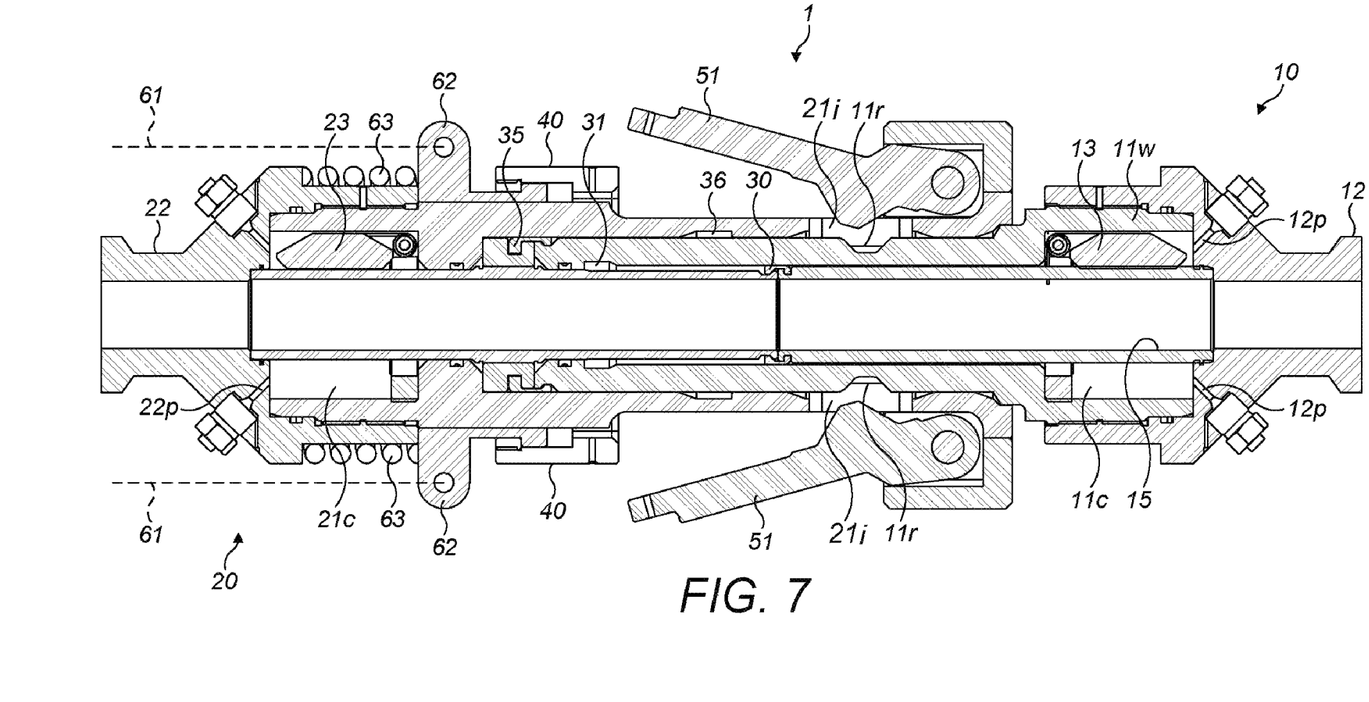
FIGS. 7-10 shows side sectional views of the FIG. 1 connector assembly in sequential stages of disconnection.

With reference to FIG. 7, when the tension in the trigger line 61 has increased sufficiently to compress the spring 63 and to pull the trigger sleeve 62 axially towards the cap 22, the tension reaches a point at which the trigger sleeve 62 engages the locking sleeve 40 and the load transfers onto the locking sleeve 40 and the pins. This can typically happen when the ship's dynamic positioning system fails to keep the ship V in one position, and it drifts off station away from the well W. When the tension across the connector assembly 1 rises above the threshold dictated by the pins, the pins are eventually sheared and the locking collar is pulled clear of the lever arms 51, which releases the dogs 55 from the plug 11.

The load shoulder on the recess 11r of the plug 11 forces the locking dogs clear of the mandrel, while the soft springs on the lever arms 51 urge the lever arms 51 gently outward and keep the dogs 55 in the outward released position. The connector assembly then adopts the configuration shown in FIG. 7.

Figure 8:
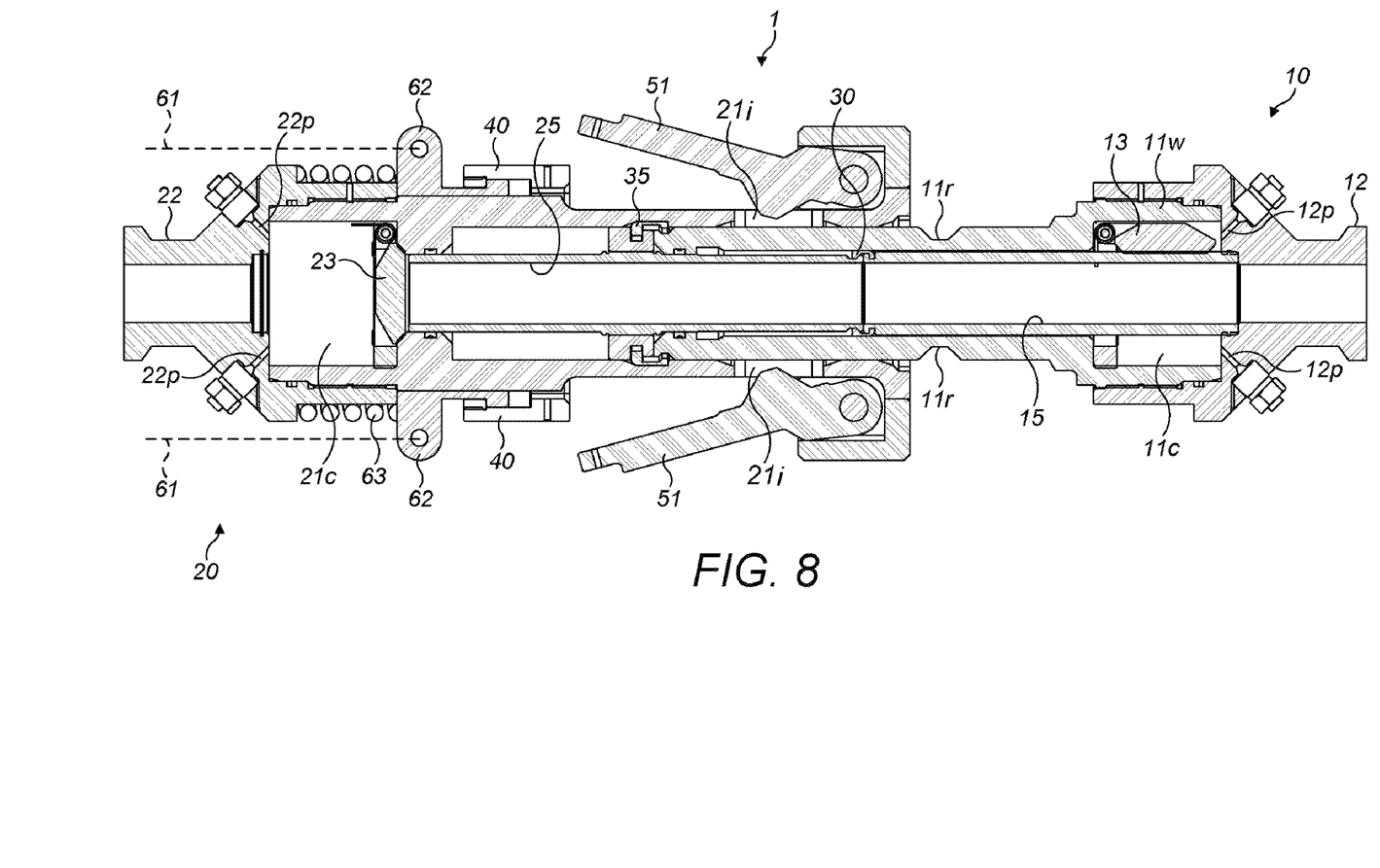

With the dogs 55 disengaged from the plug 11, the plug 11 is free to pull out of the socket 21. As this movement begins both the latch rings 30, 35 are still in the engaged and radially compressed positions so the flow tubes 15, 25 are still attached end to end, and the flow tube 25 is still attached to the end of the plug 11. As the plug 11 moves out of the socket 21, the flow tube 25 is pulled along with it (because it is connected to the plug 11 by the plug latch ring 30) which pulls the flow tube 25 out of the cavity 21c, and eventually free from the ring on which the flapper 23 is mounted. This movement exposes the cavity 21c and allows the flapper 23 to close under the force of its resilient closure device (optionally a coiled spring on its pivot axis). As axial movement of the plug 11 (and connected flow tubes 15, 25) out of the socket 21 progresses the flow tube latch ring 35 on the outer surface of the flow tube 25 eventually reaches the axial position at which it is aligned with the internal recess 36 in the bore 21b of the socket 21. The latch ring 35 expands radially into the recess 36, thereby locking the flow tube 25 against any further axial movement and optionally at the same time releasing the flow tube 25 from the end of the plug 11. The connection assembly is then in the configuration shown in FIG. 8. The annular seals between the outer surface of the flow tube 15 and the bore 21b of the socket (adjacent the end of the plug 11) and between the flow tube 25 and the socket bore 21b (adjacent to the cap 22) maintains fluid integrity through the connector, and resists escape of fluids from the bore of the flow tubes 15, 25.

Figure 9:
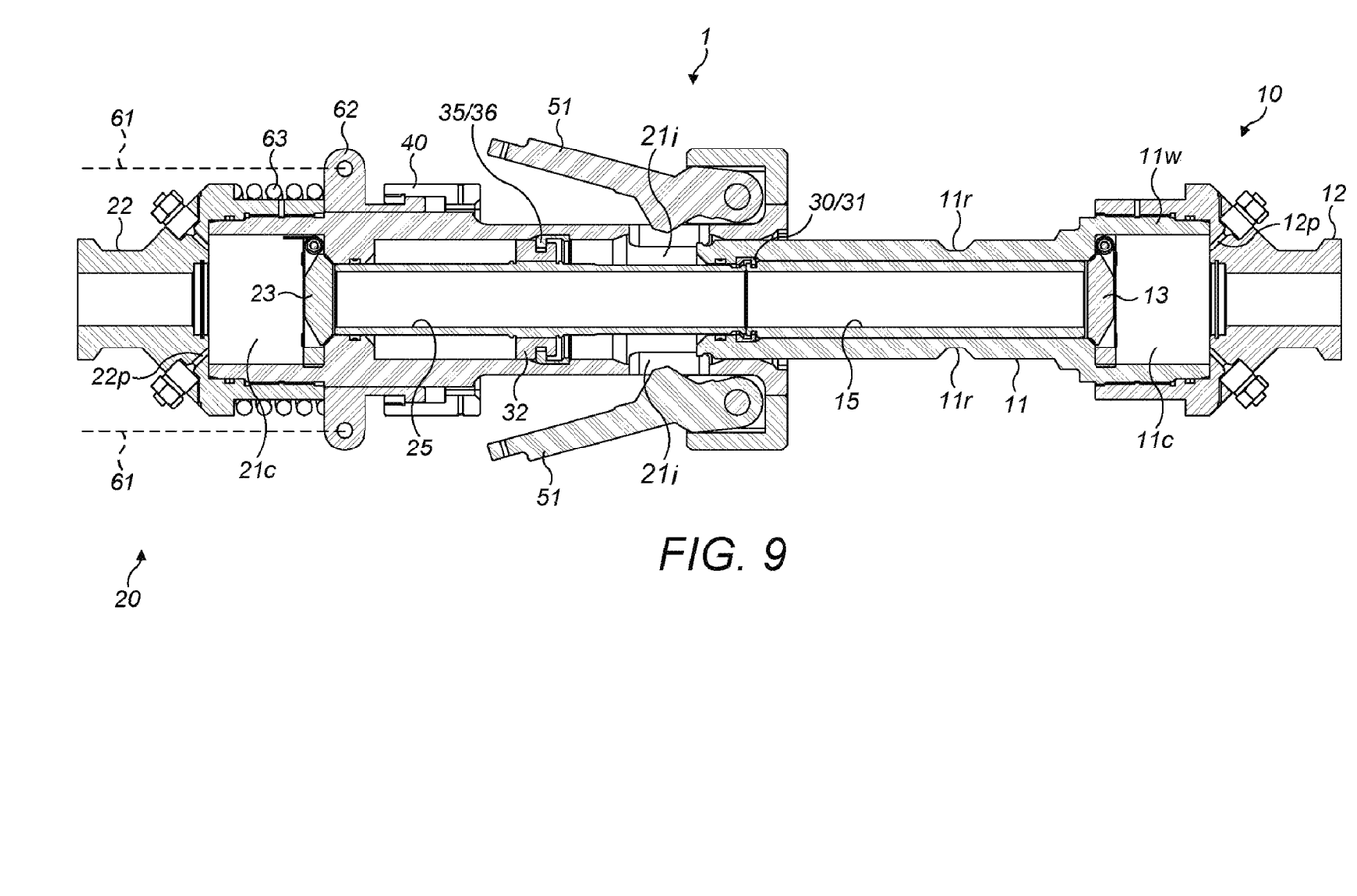
Figure 10:
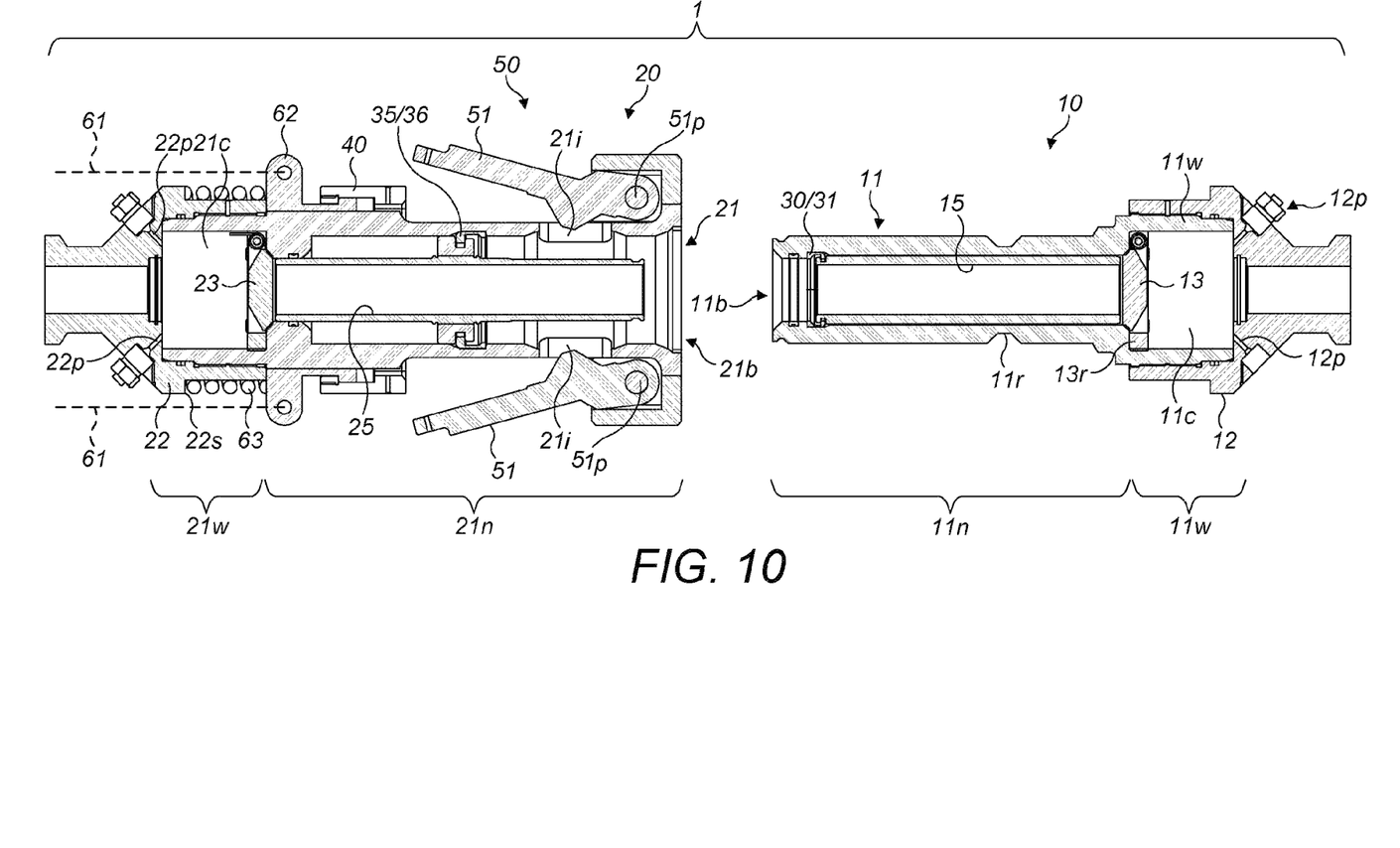

At this point the flow tubes 15, 25 are still connected together by the flow tube latch ring 30, so locking the flow tube 25 against axial movement also locks the flow tube 15 against axial movement relative to the socket 21. As the plug 11 continues to pull out of the socket, the flow tube 15 remains in place, and is therefore pulled out of the bore of the plug 11, and out of the cavity in the cap 12, and eventually free from the ring on which the flapper 13 is mounted. This movement exposes the cavity in the cap 13 and allows the flapper 13 to close under the force of its resilient closure device (optionally a coiled spring on its pivot axis). This relative movement of the flow tube 15 inside the bore of the plug 11 continues until the flow tube latch ring 30 reaches the internal groove 31 in the inner surface of the bore of the plug 11 which simultaneously prevents any further movement of the flow tube 15 in the plug 11 and disengages the flow tube 15 from the flow tube 25. The connection assembly is then in the configuration shown in FIG. 9.

Following disengagement of the flow tubes 15, 25, the plug 11 is completely free from the socket 21 and the two can separate completely. The closure of the flappers 13, 23 is accomplished prior to separation, thereby limiting the escape of fluids from the bores of the flow tubes 15, 25 into the environment.

The different examples described herein can be combined such that the features used in each example can be used in the other examples in any combination.

The invention claimed is:

1. A flow line connector assembly having first and second parts, the first part having a mating portion comprising a plug and the second part having a mating portion comprising a socket configured to receive the plug, the assembly having a restraining device to resist disconnection of the first and second parts when the plug is received in the socket,
   wherein each of the plug and socket has a respective flow tube received in a respective axial bore within the plug and socket, the flow tubes being adapted to interconnect to form a conduit for fluid to flow between the first and second parts when the plug is received in the socket,
   wherein each flow tube is axially movable in the axial bore of its respective part,
   wherein each flow tube has an inner end and an outer end with an outer surface, the assembly including a first latching device adapted to latch onto the outer surfaces of the outer ends of the flow tubes to latch the outer ends of the flow tubes together when the plug is received in the socket, and
   wherein the assembly includes a closure device in each of the plug and socket configured to close the inner end of the flow tube in each of the plug and socket during disconnection of the plug from the socket.

2. A flow line connector assembly as claimed in claim 1, wherein at least one of the flow tubes is adapted to be latched to at least one of the plug and the socket by a change in configuration of the first latching device.

3. A flow line connector assembly as claimed in claim 1, wherein the assembly includes a second latching device adapted to latch the flow tube in one of the socket and the plug to the other of the socket and the plug and to the other flow tube in a connected configuration, so that both flow tubes move with the said other of the socket and the plug when the latching device is engaged.

4. A flow line connector as claimed in claim 3, wherein the first latching device surrounds at least a part of the end portion of at least one flow tube when the flow tubes are latched together by the first latching device.

5. A flow line connector assembly as claimed in claim 1, wherein the first latching device is adapted to deactivate upon axial movement of the flow tubes within the connector assembly.

6. A flow line connector assembly as claimed in claim 1, wherein the first latching device comprises at least one resiliently biased annular member held in a first configuration in a first axial position, said annular member being adapted to move radially into a second configuration in a second axial position, the second axial position being spaced apart from the first axial position within the connector assembly.

7. A flow line connector assembly as claimed in claim 1, wherein at least one closure device is adapted to close the axial bore before the plug is removed from the socket.

8. A flow line connector assembly as claimed in claim 1, wherein each closure device is mounted on a ring in each of the first and second parts, wherein each ring comprises a bore configured to receive and allow passage of a flow tube through each ring, wherein each ring surrounds at least a portion of a flow tube, and wherein each ring is configured to allow axial movement of said flow tube through the ring.

9. A flow line connector assembly as claimed in claim 1, wherein the closure devices are arranged to be activated between open and closed configurations by axial movement of at least one flow tube within one of the plug and the socket.

10. A flow line connector assembly as claimed in claim 1, wherein the closure devices in each of the plug and the socket are arranged to be held in an open configuration by the flow tubes.

11. A method of connecting flow lines using a flow line connector assembly having first and second parts, the first part having a mating portion comprising a plug and the second part having a mating portion comprising a socket configured to receive the plug, wherein each of the plug and socket has a respective flow tube received in a respective axial bore within the plug and socket, the flow tubes each having inner and outer ends and an outer surface, wherein the flow tubes are adapted to interconnect to form a conduit for fluid to flow between the first and second parts when the plug is received in the socket, wherein each flow tube is axially movable in the axial bore of its respective part, the method comprising:
   receiving the plug within the socket;
   connecting the first and second parts by a restraining device configured to resist disconnection of the first and second parts when the plug is received in the socket;
   latching outer ends of the flow tubes together with a first latching device which latches onto the outer surfaces of the outer ends of the flow tubes; and
   closing the axial bore of each of the plug and socket during disconnection of the plug from the socket with a closure device acting on the inner end of the flow tube in each of the plug and the socket.

12. A method as claimed in claim 11, the method including latching the flow tubes to at least one of the plug and the socket and moving both of the flow tubes together with the said at least one of the plug and socket.

13. A method as claimed in claim 12, the method including latching the flow tube in the socket to the plug.

14. A method as claimed in claim 13, the method including latching and unlatching the flow tubes from one another by axial movement of at least one of the flow tubes within the flow line connector assembly.

15. A method as claimed in claim 11, wherein a first latching device acting on the flow tubes comprises a resiliently biased annular member, wherein the method includes switching the first latching device between activated and deactivated configurations by changing the configuration of the resiliently biased annular member between a first configuration in a first axial position, and a second configuration in a second axial position, wherein the second axial position is spaced apart from the first axial position within the flow line connector assembly.

16. A method as claimed in claim 11, the method including activating the closure device by axial movement of at least one flow tube within one of the plug and the socket.

17. A method as claimed in claim 11, including latching the flow tubes together until the two parts of the flow line connector assembly are separated by a minimum distance.

18. A flow line connector assembly having first and second parts, the first part having a mating portion comprising a plug and the second part having a mating portion comprising a socket configured to receive the plug, the assembly having a restraining device to resist disconnection of the first and second parts when the plug is received in the socket, wherein the plug comprises a first flow tube and the socket comprises a second flow tube, the first and second flow tubes each having a bore and being adapted to interconnect to form a conduit for fluid to flow between the first and second parts when the plug is received in the socket, wherein each of the first and second flow tubes is axially movable within its respective part, and wherein each of the plug and the socket has a closure device configured to activate to close a bore of each of the plug and the socket during disconnection of the plug from the socket, wherein each of the first and second flow tubes has an inner end and an outer end, the assembly including a first latching device adapted to latch the outer ends of the first and second flow tubes together when the plug is received in the socket, wherein the first latching device is adapted to latch the first flow tube in the plug to the second flow tube in a connected configuration, and wherein the assembly includes a second latching device adapted to latch the second flow tube in the socket to the plug, and wherein both of the first and second flow tubes move together with the plug when the first and second latching devices are engaged and the plug is withdrawn from the socket.

19. A flow line connector assembly as claimed in claim 18, wherein the first latching device latches onto the outer surfaces of the outer ends of the flow tubes.

20. A flow line connector as claimed in claim 18, wherein the first latching device surrounds at least a part of the outer end of at least one flow tube when the flow tubes are latched together by the first latching device.

21. A flow line connector assembly as claimed in claim 18, wherein the first latching device is adapted to deactivate upon axial movement of the flow tubes within the connector assembly.

22. A flow line connector assembly as claimed in claim 18, wherein the first latching device comprises at least one resiliently biased annular member held in a first configuration in a first axial position, said annular member being adapted to move radially into a second configuration in a second axial position, the second axial position being spaced apart from the first axial position within the connector assembly.

23. A flow line connector assembly as claimed in claim 18, wherein at least one closure device is adapted to close the axial bore before the plug is removed from the socket.

24. A flow line connector assembly as claimed in claim 18, wherein each closure device is mounted on a ring in each of the first and second parts, wherein each ring comprises a bore configured to receive and allow passage of a flow tube through each ring, wherein each ring surrounds at least a portion of a flow tube, and wherein each ring is configured to allow axial movement of said flow tube through the ring.

25. A flow line connector assembly as claimed in claim 18, wherein the second latching device comprises a resiliently compressed collet device, and wherein axial movement of the first and second flow tubes together with the plug relative to the socket as the plug is withdrawn from the socket withdraws the second flow tube from the socket until the second latching device radially expands into a recess on the socket which disengages the second flow tube from the plug permitting relative axial movement of the plug relative to the first and second flow tubes, and wherein the radial expansion of the second latching device into the recess latches the first and second flow tubes to the socket resisting axial movement of the first and second flow tubes relative to the socket as the plug is withdrawn from the socket.

26. A flow line connector assembly as claimed in claim 25, wherein the first latching device comprises a resiliently compressed collet device, and wherein following radial expansion of the second latching device into the recess, the first and second flow tubes remain latched together and latched to the socket during withdrawal of the plug from the socket until the first latching device radially expands into a recess on the plug which disengages the first and second flow tubes from one another, permitting relative axial movement of the first and second flow tubes as the plug is withdrawn from the socket.

27. A flow line connector assembly as claimed in claim 25, wherein the withdrawal of the second flow tube from the socket slides the second flow tube axially relative to the closure device in the socket, and wherein the closure device in the socket closes the inner end of the second flow tube when the second latching device has radially expanded into the recess on the socket.

28. A flow line connector assembly as claimed in claim 26, wherein the relative axial movement of the first and second flow tubes as the plug is withdrawn from the socket, and wherein the closure device in the plug closes the inner end of the first flow tube when the first latching device has radially expanded into the recess on the plug.

* * * * *